(12) United States Patent
Moretti

(10) Patent No.: US 10,912,307 B2
(45) Date of Patent: Feb. 9, 2021

(54) ELECTRIC OVEN

(71) Applicant: MORETTI FORNI S.P.A., Mondolfo (IT)

(72) Inventor: Mario Moretti, Pesaro (IT)

(73) Assignee: MORETTI FORNI S.P.A., Mondolfo (IT)

( * ) Notice: Subject to any disclaimer, the term of this patent is extended or adjusted under 35 U.S.C. 154(b) by 0 days.

(21) Appl. No.: 16/648,132

(22) PCT Filed: Oct. 3, 2018

(86) PCT No.: PCT/IB2018/057691
§ 371 (c)(1),
(2) Date: Mar. 17, 2020

(87) PCT Pub. No.: WO2019/073339
PCT Pub. Date: Apr. 18, 2019

(65) Prior Publication Data
US 2020/0229448 A1 Jul. 23, 2020

(30) Foreign Application Priority Data
Oct. 12, 2017 (IT) .................. 102017000115086

(51) Int. Cl.
*A21B 1/22* (2006.01)
*A21D 13/41* (2017.01)
*A21B 3/02* (2006.01)
*F24C 15/08* (2006.01)
*F24C 15/32* (2006.01)
*F27D 1/02* (2006.01)
(Continued)

(52) U.S. Cl.
CPC ............. *A21B 1/22* (2013.01); *A21B 3/02* (2013.01); *A21D 13/41* (2017.01); *F24C 15/08* (2013.01); *F24C 15/325* (2013.01); *F27D 1/025* (2013.01); *F27D 1/06* (2013.01); *H05B 3/748* (2013.01)

(58) Field of Classification Search
CPC .... A21B 1/22; A21B 1/52; A21B 1/02; A21B 3/02; A21D 13/41; F24C 15/08; F24C 15/325; F27D 1/025; F27D 1/06; H05B 3/748; H05B 3/0076; H05B 3/0071; H05B 3/008; H05B 1/0258; H05B 1/0261; H05B 1/0263; B60B 3/16
See application file for complete search history.

(56) References Cited

U.S. PATENT DOCUMENTS

| 4,706,832 A | 11/1987 | Citino |
| 5,492,055 A | 2/1996 | Nevin et al. |
| 6,745,758 B1 | 6/2004 | Minidis |

FOREIGN PATENT DOCUMENTS

| FR | 2347622 A1 | 11/1977 |
| JP | 2003061558 A | 3/2003 |

(Continued)

*Primary Examiner* — Shawntina T Fuqua
(74) *Attorney, Agent, or Firm* — King & Schickli, PLLC

(57) ABSTRACT

An enhanced electric oven (10) comprising an oven-body (12) and a vault or dome (14) which externally enclose an oven cavity or cooking cavity (17), a flue (16) for fume exhaust, a mouth (18) for accessing the oven cavity (17), closable by way of a door (20), a dish supporting plane (22) placed outside the mouth (18), a hood (23), if any, a lower heating plate (33), and an upper heating plate (33A) which accommodate electric resistors, a modular and removable cooking plane (34) made from a refractory material, and means for controlling and distributing heat flow within the oven.

10 Claims, 6 Drawing Sheets

Figure 1:
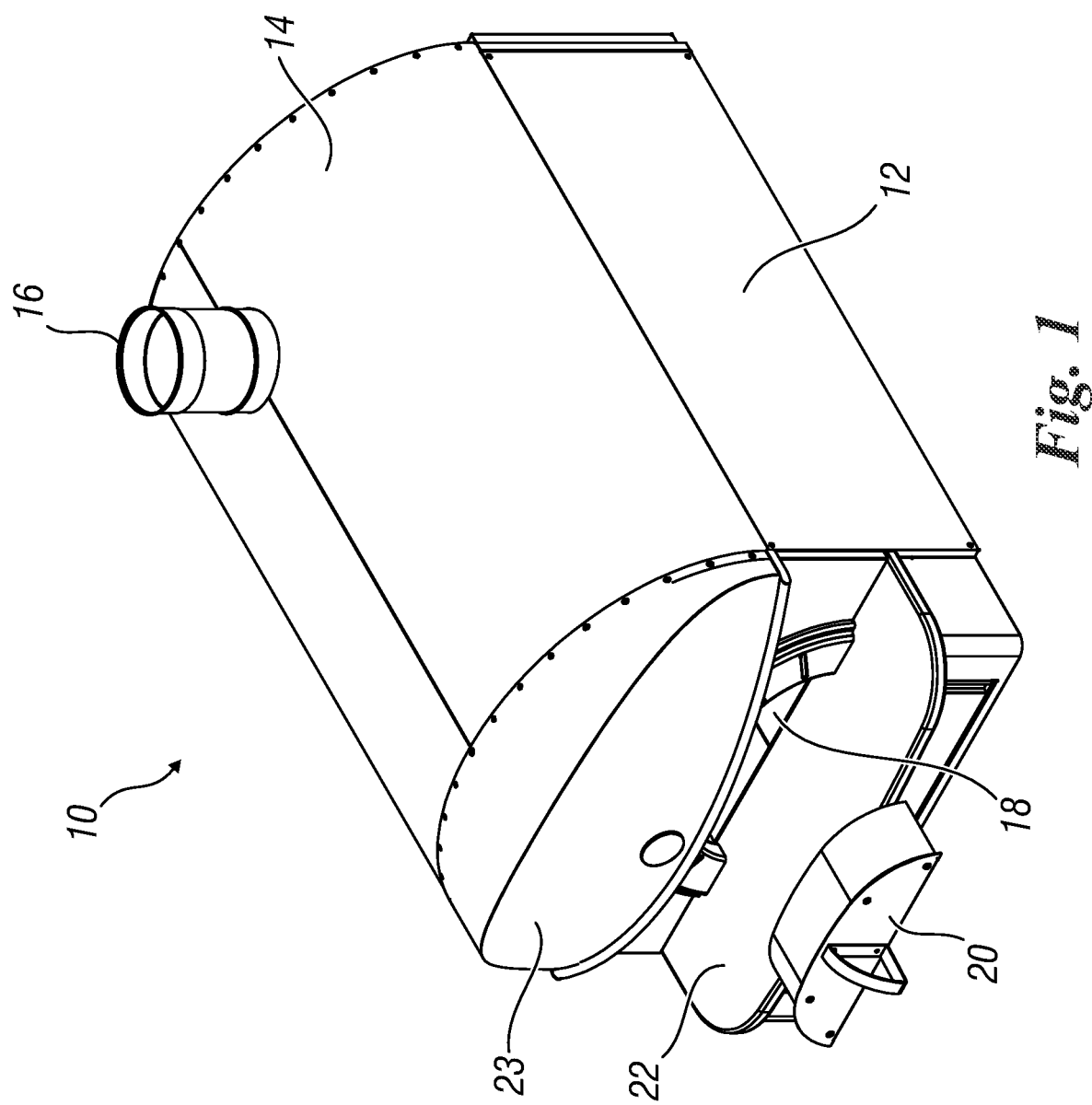

(51) Int. Cl.
*F27D 1/06* (2006.01)
*H05B 3/74* (2006.01)

(56) References Cited

FOREIGN PATENT DOCUMENTS

| | | |
|---|---|---|
| JP | 2006230210 A | 9/2006 |
| JP | 2016136886 A | 8/2016 |

ELECTRIC OVEN

FIELD OF THE INVENTION

The present invention relates to an enhanced electric oven.

BACKGROUND

More specifically, the present invention relates to an enhanced electric oven and, even more specifically, to an electric oven for cooking pizza and similar dishes.

As it is known, with special reference to pizza and other types of similar dishes such as, for instance, folded-over pizza (a so called "calzone") or other known variants of pizza.

Also, different types of pizza are known such as, for instance, thick pizza or thin pizza, wherein thickness and/or rising vary, Neapolitan pizza, which is ruled by ad-hoc specifications ("disciplinare" in Italian), Sicilian or Roman pizza, American pizza, and so on.

With reference to Neapolitan pizza, according to the specifications that rule its preparation and cooking mode worldwide, an oven is required for its cooking wherein a temperature as high as 485° C. is reached.

In traditional ovens, definitely lower temperatures are used (about 350° C.) and the floor of ovens comprises surfaces made from a material having high density (weight to volume ratio) technical characteristics and, consequently, a low apparent porosity.

These characteristics make it possible to achieve premium performances when operating at full load or regular load. The heating plate highly overheats and holds such characteristics over time, thus providing for a uniform cooking even after frequent batches.

A material having such characteristics comprises, for instance, a mixture of cordierite-mullite formed by way of pressing, drawing, extrusion, or similar known processings.

However, especially during transients, i.e. in light duty periods and in correspondence with the first batches after switch on, the lower plate overheats to such an extent as to immediately transfer it onto the pizza thus determining burns, more evident on the lower part, and the burnt parts are toxic because they lead to Acrylamide and Polycyclic Aromatic Hydrocarbons (PAH).

The capability of coping with such excessive overheating is committed to the pizza maker's ability, who shall manage to try and find the best how long a pizza should stay in the oven, to rotate/turn the food being cooked, or to use unsophisticated methods such as cooking disposable flat breads ("focacce") in order to adjust the temperature of the cooktop to an optimum value.

Also, the more temperature increases, the more the phenomenon grows and becomes unmanageable, thus determining a so-called oven "nervousness" effect.

In order to solve this drawback, a solution consist of modifying the cooktop by using a material having low density (weight to volume ratio) technical characteristics, hence a high apparent porosity.

In such situation, the absorbed heat is released gradually and softly, thus preventing toxic burns, especially in the lower zone of pizza.

A material suitable for this purpose is a clay- and pozzolana-based refractory mixture (slangly also referred to as "Biscuit").

By using such material for the cooktop, an oven becomes perfectly stable and exhibits excellent performances at 485° C.

However, if one comes back and cooks at temperatures below 400° C., the limited radiating power of the "Biscuit" floor determines partial or more lasting cookings (a phenomenon that is slangly referred to with the expression "the oven relaxes"), and a need arises of introducing idle periods from one batch to the other to let the oven recover, and consequently unacceptably reduced productivities.

Another drawback that is typical of traditional ovens is bound to loss of heat, which takes place in the front part of the oven (i.e. in correspondence with its mouth) determined by the fact that the mouth of an oven generally remains open while cooking and being only closed while the oven is being heated in order to reach a temperature suitable for cooking.

A further drawback consists in that the cooktops made from a biscuit-like material (a material that is soft as compared to cordierite-mullite) are subject to a frequent tear and wear (every three years indicatively) and its replacement is an extremely impacting operation; such operation entails a complete replacement of the floor of the cooktop and also affects the remaining electric parts (resistors), an extensive operation that shall be performed by skilled persons and entails loss of working days.

SUMMARY

An object of the present invention is to obviate the above described drawbacks.

More specifically, an object of the present invention is to provide an electric oven, specially but not exclusively for cooking pizza, that provides higher performances than traditional ovens, be they wood-fired or electric ovens, in full compliance with the specifications ("disciplinare") in force ruling preparation and cooking of the dishes for which said ovens are designed and used.

A further object of the present invention is to provide an electric oven that allows to cook pizza and similar dishes in an optimum and uniform manner without burns, especially in the lower part of the dish being in contact with the cooktop.

A further object of the present invention is to provide an oven that does not produce the phenomenon referred to with the expression "the oven relaxes" and, consequently, an oven that requires the introduction of idle periods between one batch and the other to let the oven recover.

A further object of the present invention is to provide an oven that does not cause loss of heat in face of the oven cavity, i.e. in correspondence with the mouth.

A further object of the present invention is to put at users' disposal an enhanced electric oven suitable for guaranteeing a high lifetime and reliability over time and also such as to be implemented in an easy and cost-effective manner.

These objects and others are achieved by the invention that has the characteristics according to claim 1.

In accordance with the invention, an enhanced electric oven is provided comprising an oven-body and a vault or dome which externally enclose the oven cavity or cooking cavity, a flue for fume exhaust, a mouth for accessing the oven cavity closeable by way of a door, a dish supporting plate located outside the mouth, a hood, if any, a lower heating plate and an upper heating plate which accommodate electric resistors, a cooktop made from a modular and removable refractory material and means for controlling and distributing heat flow inside the oven. Advantageous embodiments of the invention are apparent from the dependent claims.

BRIEF DESCRIPTION OF THE DRAWING FIGURE

Figure 2:
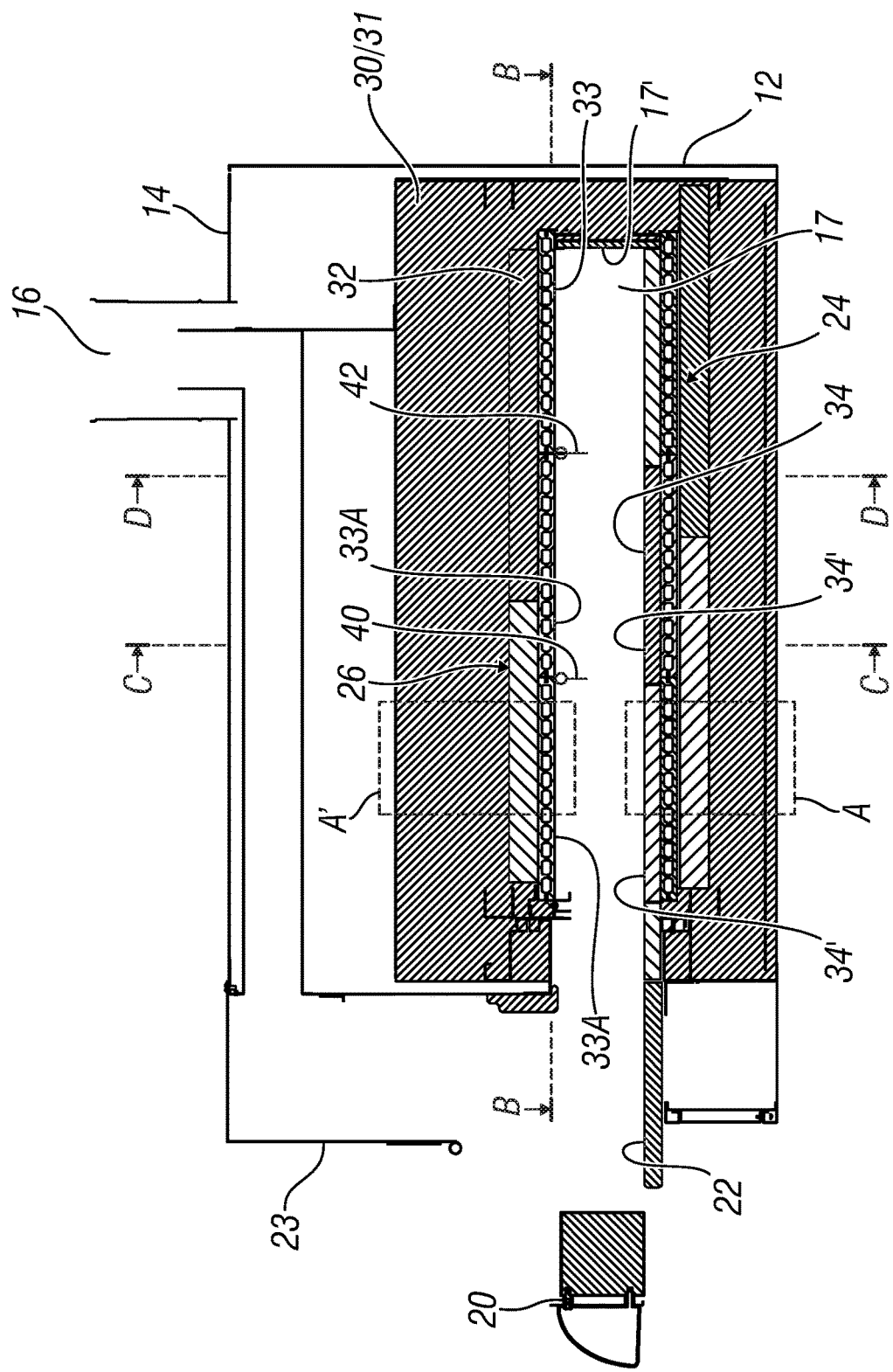
Figure 3:
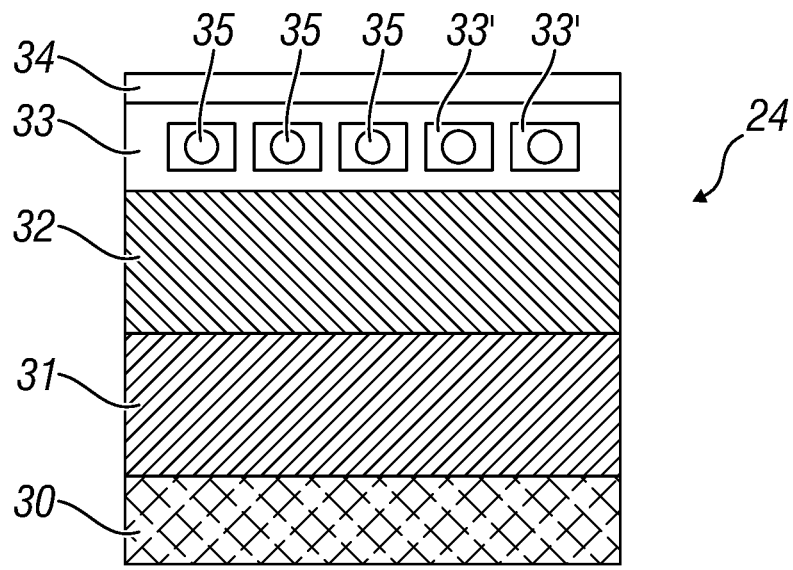
Figure 3A:
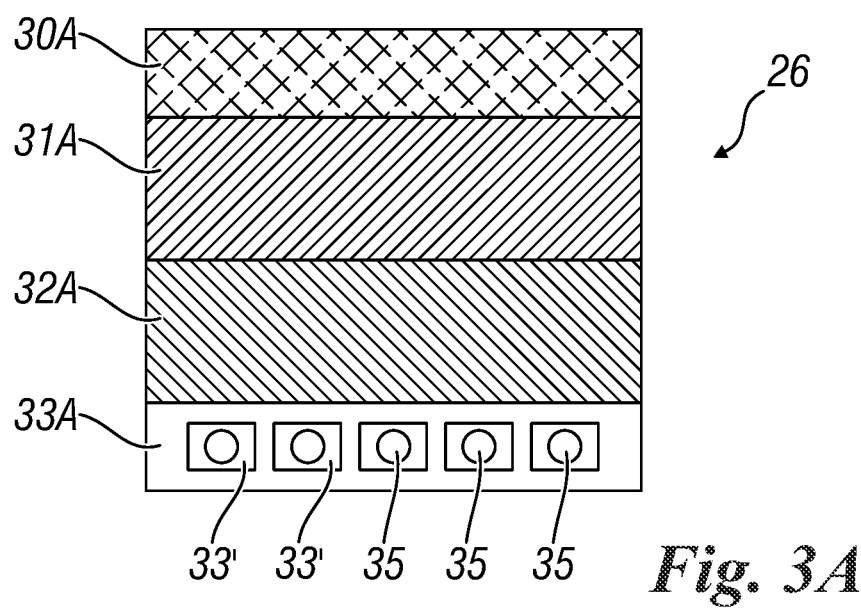
Figure 4:
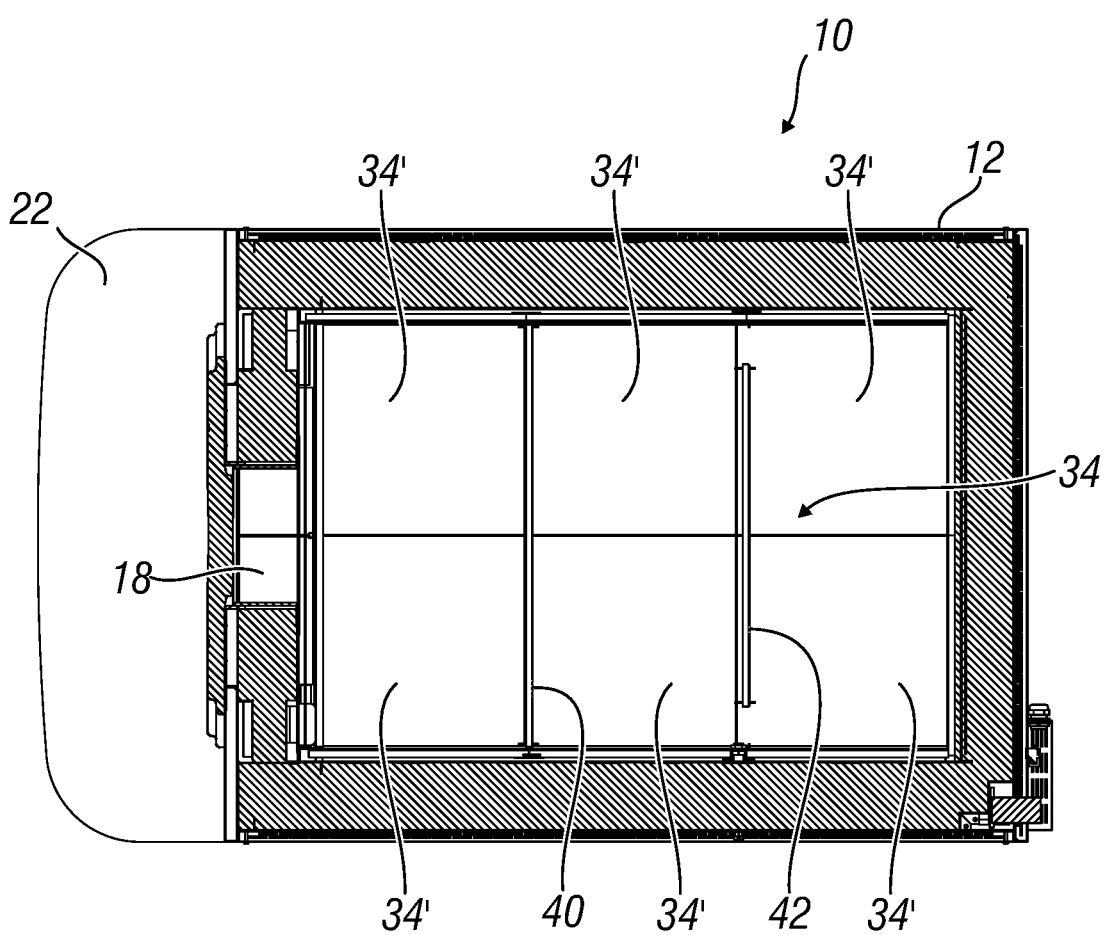
Figure 5:
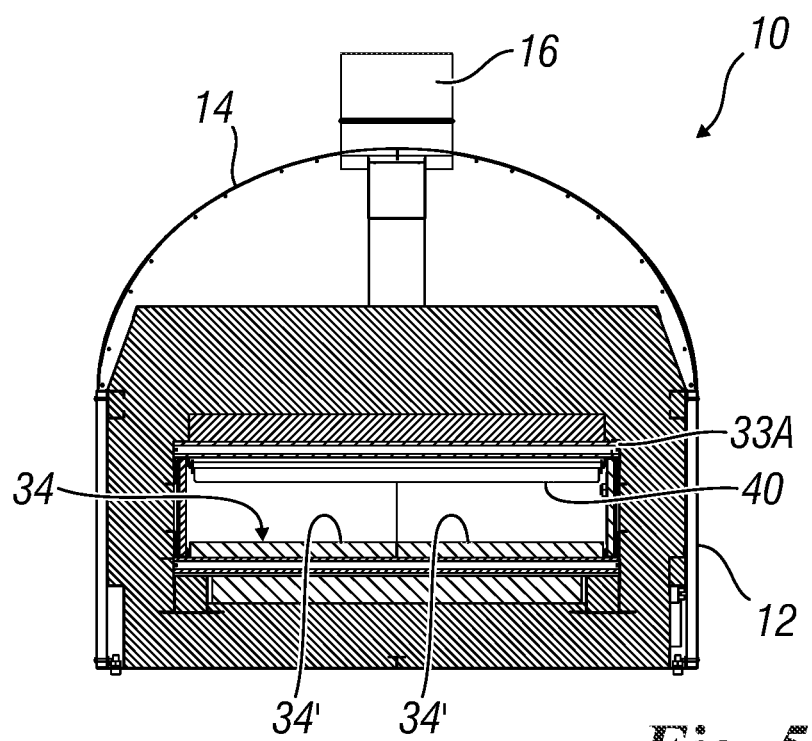
Figure 6:
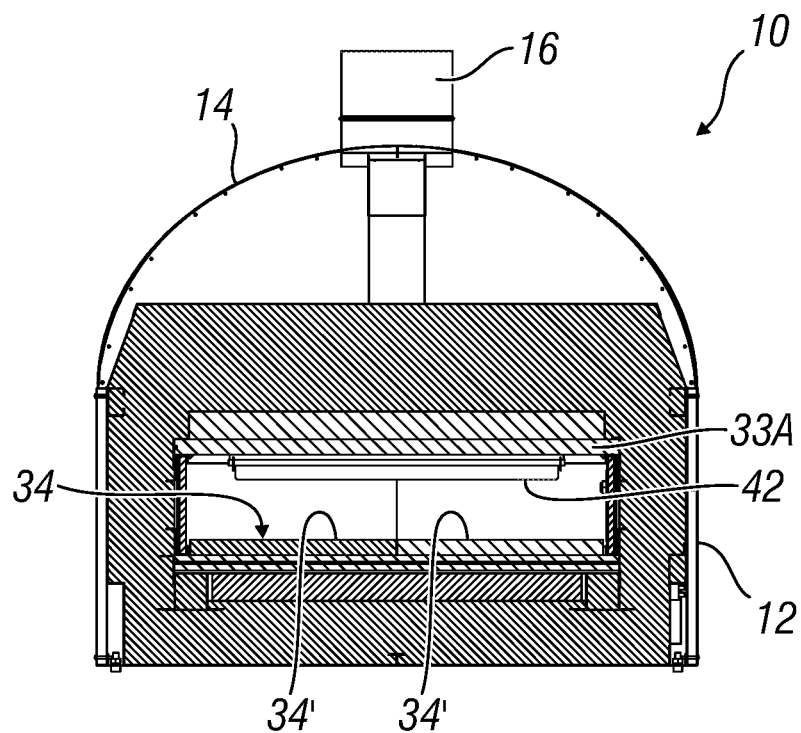
Figure 7:
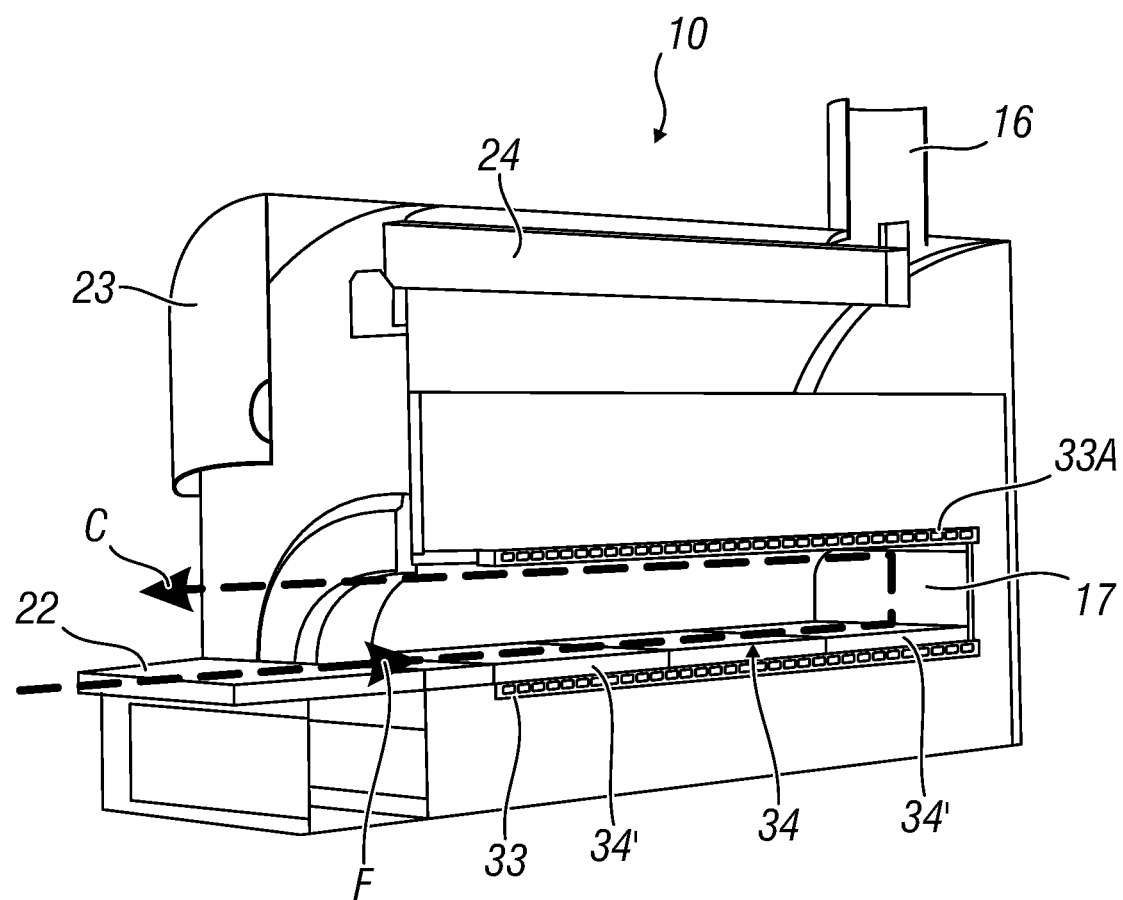

The constructional and functional characteristics of an enhanced electric oven according to the present invention can be better understood from the following detailed description, wherein reference is made to the attached drawings which illustrate a preferred but not limiting embodiment thereof and wherein:

FIG. 1 schematically shows an axonometric view of an enhanced electric oven according to the invention;

FIG. 2 schematically shows a view of the oven cross-sectioned according to a longitudinal vertical plane;

FIG. 3 schematically shows an enlarged detail of a portion as indicated by box "A" in FIG. 2;

FIG. 3A schematically shows an enlarged detail of a portion as indicated by box "A'" in FIG. 2;

FIG. 4 schematically shows a cross-section according to a plane B-B as indicated in FIG. 2;

FIG. 5 schematically shows a cross sectional view according to a plane C-C in FIG. 2;

FIG. 6 schematically shows a cross sectional view according to a plane D-D in FIG. 2, FIG. 7 schematically shows an electric oven according to the invention, cross sectioned according to a vertical longitudinal plane, wherein the heat flows are highlighted.

DETAILED DESCRIPTION

With reference to the mentioned figures, an enhanced electric oven according to the invention, indicated by the reference numeral 10 as a whole, comprises an oven-body 12 and a vault or dome 14, which enclose the oven cavity or cooking cavity 17, a flue 16 for fume exhaust, a mouth 18 for accessing the oven cavity 17, closeable by way of a door 20, a dish supporting plane 22 placed outside the mouth 18, and a hood 23, if any.

The oven cavity or cooking cavity 17 comprises an oven floor 24 and a cooking vault 26, said cooktop and cooking vault accommodating the resistors necessary for heating the oven, as detailed below.

Considering the oven floor 24 and making reference to FIG. 3, which details a portion of said floor, it comprises at least one first low-temperature layer 30 (the lowermost one, opposed to the dish supporting surfaces which faces the cooking vault 26; such layer is optional), a second layer 31 arranged above said first layer 30 and defining a medium temperature insulating thickness, a third layer 32 arranged above the second layer 31 and defining a high temperature insulating thickness, a lower heating plate 33 made from a refractory material arranged above the third layer 32 and including in its own thickness a number of cavities 33' (formed orthogonally to the thickness dimension) parallel to each other and internally to which there are accommodated bare wire coiled electric resistors 35, and a cooktop 34 arranged above the heating plate 33.

Note that the at least one first layer 30, the second layer 31, the third layer 32, and the heating plate 33 are also present, in the same superimposed arrangement, in the cooking vault 26 and define its structure; for the sake of greater understandability and to distinguish them from the same elements of the oven floor 24, such elements will be indicated (with reference to FIG. 3A) as first layer 30A, second layer 31A, third layer 32A, and heating plate 33A, respectively whereas the cavities formed orthogonally to the dimension of the thickness of the heating plate 33A are indicated with the same reference numeral 33' and the bare wire coiled electric resistors accommodated in said cavities are indicated with the same reference numeral 35.

Such layered structure is made necessary by the high temperatures at stake in the oven and in order to guarantee a superior insulating power in order to better direct heat toward the center of the cooking cavity and, in order to achieve this, the second layer 31 and the third layer 32 are used, wherein the second layer 31 comprises a less dense insulating layer and wherein the third layer 32 comprises a more dense insulating layer than the second layer because it is in contact with the cooking cavity 17 (the zone that is closest to the cooking cavity features the highest temperatures), this in order to take account of the different ranges of temperature of the insulating zone more distant from the cooking cavity.

In addition, the first layer 30 (the more distant) from the cooking cavity) is optional and, as described before, it might comprise several layers in order to reach maximum efficiency values.

In particular, the heating plate 33/33A, of both the oven floor 24 and the cooking vault 26, is not made of one piece, but it is rather formed of individual modules arranged adjacent to each other to form an assembled heating plate 33.

Likewise, the cooktop 34 is not made of one piece, but it rather comprises individual modules 34' (also called "martyr planes"), arranged adjacent to and coupled with each other to define a cooktop 34.

The individual modules 34' that make up the cooktop 34 are made from a clay- and pozzolana-based refractory material (the material referred to above as "Biscuit") and, according to some embodiments and on the basis of a specific cooking requirement, they can feature a surface microroughness obtained, for instance, by way of a sand-blasting process, which can serve as a tool to create an air micro-recirculation between the oven floor 24 and the lower part of the pizza or a similar dish being cooked, and this in order to prevent any interference phenomena and, consequently, to minimize burns of the pizza itself.

The modules 34' that make-up the cooktop 34 can be individually replaced in case of tear and wear or collapse/failure, or even interchanged by replacing, for instance, the modules in the central or bottom part of the oven, which are tendentially more worn, with those arranged in correspondence with the oven mouth 18, which are typically less worn.

In order to provide optimum heating and efficiency characteristics for an optimum cooking of dishes like pizza, considering the high temperatures that are reached inside the cooking cavity, and considering that, while cooking, the door or mouth 18 of the oven remains permanently open (for a more comfortable use thereof), and that, consequently, big loss of heat take place in correspondence with said mouth, the electric oven according to the present invention comprises means suitable for controlling and spreading the heat flow inside the oven.

As a matter of fact, as schematically shown in FIG. 7, the cold air (indicated by the arrow "F") enters the cooking cavity 17 from the oven mouth 18 in correspondence with the lower zone of said oven cavity (i.e. the zone in correspondence with the cooktop), impacts the product being cooked placed inside the oven cavity and, by heating, goes up toward the upper zone of the cavity, i.e. the vault or dome, and tends to exit from the same mouth 18 in correspondence with the upper portion of the latter (as indicated by the arrow "C" in FIG. 7).

The means suitable for solving the above described problems include at least one shield or plate-like element transversally arranged in the cooking cavity 17 in correspondence with the upper part of the oven facing the direction opposed to that of the cooktop; as better described below, in the preferred embodiment depicted by the figures, the mentioned shields are two and comprise a first shield 40 and a second shield 42, the first shield 40 being closer to the oven mouth 18 and, in principle, at about ⅓ or half the development of the cooking cavity in the depth dimension, the second shield 42 being arranged downstream of the first shield, i.e. in correspondence with a bottom wall 17' of the cooking cavity 17 and, in principle, at approximately ⅔ of the development of the cooking cavity in the depth dimension. The first shield 40 has a development, in the width dimension, substantially corresponding to that of the development of the cooking cavity 17, in the width dimension, and is hinged to the upper heating plate 33A. The second shield 42 features a development, in the width dimension, lower than that of the first shield 40 and is also hinged to the upper heating plate 33A.

The function of said second shield 42 is to slow down the heat flow but, having a width lower than the width of the cooking cavity 17, it provides a right convective heat transfer by spreading it all along the width of the cooking cavity, not only centrally.

Conversely, the function of the first shield 40, whose width substantially corresponds to that of the cooking cavity, is to slow down the heat that directs toward the oven mouth 18.

In this way, heat does not go lost, but its flow is slowed down and remains concentrated in the bottom portion of the cooking cavity, where the temperatures are higher and where a cook places dishes such as pizza (which require higher temperatures), whereas he/she will use the front part close to the mouth 18 (a less hot zone) for cooking dishes that need less heat such as, for instance, folded-over pizza ("calzone") and the like.

In addition, both the first and second shields, being hinged with respect to the upper heating plate as described above, are pivoting ones, consequently they do not interfere when placing dishes in the oven and, also, they can be lifted and/or blocked (by means of stop elements) or, alternatively, temporarily removed for cooking dishes that are thick and such as to possibly interfere with said shields.

According to the foregoing, the advantages achieved by using an enhanced electric oven according to the present invention are apparent.

An enhanced electric oven according to the present invention has the advantage of providing higher performances than traditional ovens, be they wood-fired or electric ovens in full compliance with the ad-hoc specifications ("disciplinari") in force which rule preparation and cooking of the dishes for which said ovens are designed and used, and this, in particular, for that which concerns preparation of pizza (especially Neapolitan pizza) and the like.

A further advantage consists in that an oven according to the invention, thanks to the presence of a cooktop, makes it possible to cook pizza and similar dishes in an optimum and uniform manner and without burns, especially in the lower part of the dish being in contact with the cooktop.

Further advantageous is the fact that the cooktop of the oven being constructed according to a modular approach makes it possible an easy and quick replacement of the individual modules in case of tear and wear or damages, and also makes it possible to perform a rotation of the same modules by replacing the modules in the central or bottom part of the oven, which are tendentially more worn, with those arranged in correspondence with the oven mouth 18, which are typically less worn.

A further advantage consists in that a thus structured oven does not entail problems or phenomena of the type: "the oven relaxes", and, consequently, it is not necessary to introduce idle periods between one batch and the other to let the oven recover.

Also, the presence of the above described shields advantageously prevents loss of heat in face of the oven cavity, i.e. in correspondence with the oven mouth.

Even though the invention has been described above with a special reference to one embodiment thereof, given for explanatory non-limitative purposes only, numerous modifications and variants will be apparent to those skilled in the art in the light of the above description. Therefore, the present invention shall be construed to embrace any modifications and variants that fall in the scope of the following claims.

The invention claimed is:

1. An enhanced electric oven (10) comprising an oven-body (12) and a vault or dome (14) which externally enclose an oven cavity or cooking cavity (17), a flue (16) for fume exhaust, a mouth (18) for accessing the oven cavity (17), closeable by way of a door (20), a dish supporting plane (22) placed outside the mouth (18), a lower heating plate (33), and an upper heating plate (33A) which accommodate electric resistors, the oven being characterized in that it comprises a modular and removable cooktop (34) made from a refractory material formed of individual modules (34) arranged adjacent to and coupled with each other, and means for controlling and distributing heat flow within the oven comprising at least one shield or plate-like element transversally arranged in the cooking cavity (17) in correspondence with the upper heating plate (33A) opposed to the cooktop (34) and hinged to and pivoting with respect to the upper heating plate (33A).

2. The oven according to claim 1, characterized in that the modules (34') are made from a clay- and pozzolana-based refractory material.

3. The oven according to claim 1, characterized in that the oven floor (24) comprises at least one first layer (30) or lowest low-temperature layer, one second layer (31) arranged above said first layer (30) and defining a medium-temperature insulating thickness, one third layer (32) arranged above the second layer (31) and defining a high-temperature insulating thickness, one heating plate (33) made from a refractory material placed above the third layer (32) and which comprises, in its own thickness, cavities (33') formed orthogonally to the thickness dimension, parallel to each other and inside which there are accommodated bare wire coiled electric resistors (35), a cooktop (34) placed above the heating plate (33), the first layer (30) being optional.

4. The oven according to claim 1, characterized in that the cooking vault (26) comprises a first layer (30A), a second layer (31A) superimposed to the first layer and defining a medium-temperature insulating thickness, a third layer (32A) superimposed to the second layer (31A) and defining a high-temperature insulating thickness, a heating plate (33A) facing the oven floor (24) made from a refractory material superimposed to the third layer (32A) comprising in its own thickness cavities (33') formed orthogonally to the thickness dimension, parallel to each other and inside which there are accommodated electric resistors (35), the first layer (30A) being optional.

5. The oven according to claim 1, characterized in that it comprises two shields, namely a first shield (40) and a second shield (42).

6. The oven according to claim 5, characterized in that the first shield (40) has a development, in the width dimension, substantially corresponding to that of the development, in the width dimension, of the cooking cavity (17), and the second shield (42) has a development, in the width dimension, shorter than that of the first shield (40).

7. The oven according to claim 6, characterized in that the first shield (40) is placed closer to the oven mouth 18 and, in principle, at about ⅓ of the development, in the depth dimension of the cooking cavity (17), the second shield (42) being arranged downstream of the first shield, i.e. in correspondence with a rear wall (17') of the cooking cavity (17) and, in principle, at about ⅔ of the development, in the depth dimension, of the cooking cavity itself, said first shield (40) defining a means for slowing down the heat directed toward the oven mouth (18), and the second shield (42) defining a means for providing a right convective heat transfer by spreading it all along the width of the cooking cavity, not only centrally.

8. The oven according to claim 1, characterized in that the at least one shield or plate-like element can be lifted and/or blocked by way of stop elements.

9. The oven according to claim 1, characterized in that the at least one shield or plate-like element is temporarily removable.

10. The oven according to claim 1, characterized in that it comprises a hood (23).

* * * * *